Sept. 16, 1930. M. P. GEHRET 1,776,220
APPARATUS FOR FABRICATING WIRE MESH
Filed Feb. 24, 1930 11 Sheets-Sheet 1

Inventor:—
Mahlon P. Gehret
Deceased,
by Mary A. Gehret,
Executrix.
by her Attorneys.
Howson Howson Sept. 16, 1930. M. P. GEHRET 1,776,220
APPARATUS FOR FABRICATING WIRE MESH
Filed Feb. 24, 1930 11 Sheets-Sheet 2

Inventor:
Mahlon P. Gehret
Deceased.
by Mary A. Gehret,
Executrix.
by her Attorneys
Howson & Howson Sept. 16, 1930.    M. P. GEHRET    1,776,220
APPARATUS FOR FABRICATING WIRE MESH
Filed Feb. 24, 1930    11 Sheets-Sheet 3

Inventor:—
Mahlon P. Gehret
Deceased.
by Mary A. Gehret
Executrix.
by her Attorneys
Howson & Howson

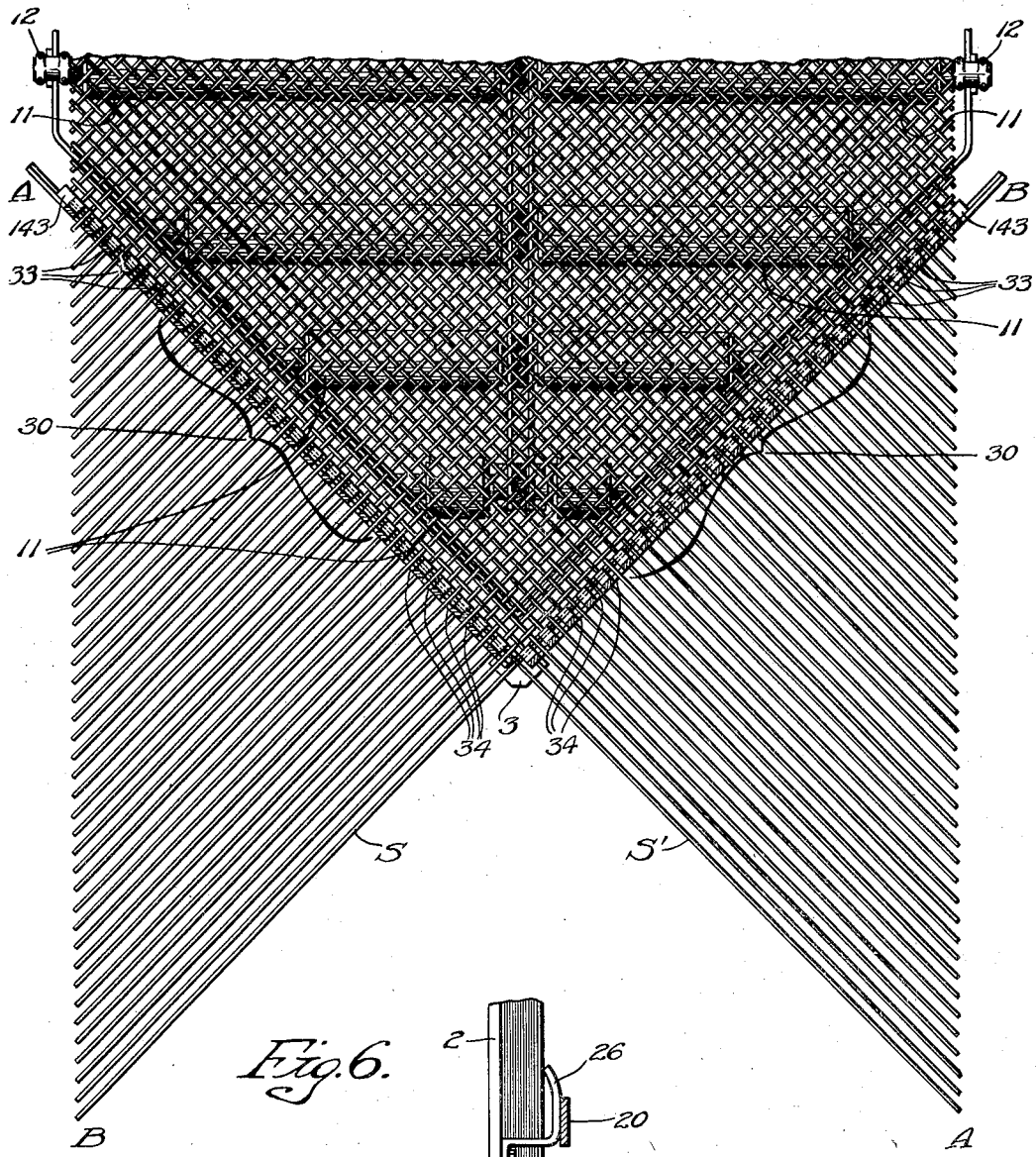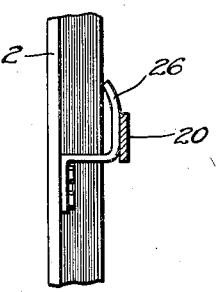

Sept. 16, 1930.        M. P. GEHRET              1,776,220
           APPARATUS FOR FABRICATING WIRE MESH
              Filed Feb. 24, 1930      11 Sheets-Sheet 5

Inventor:—
Mahlon P. Gehret,
    Deceased.
by  Mary A. Gehret,
       Executrix.
   by her Attorneys
   Howson & Howson Sept. 16, 1930.  M. P. GEHRET  1,776,220
APPARATUS FOR FABRICATING WIRE MESH
Filed Feb. 24, 1930   11 Sheets-Sheet 6
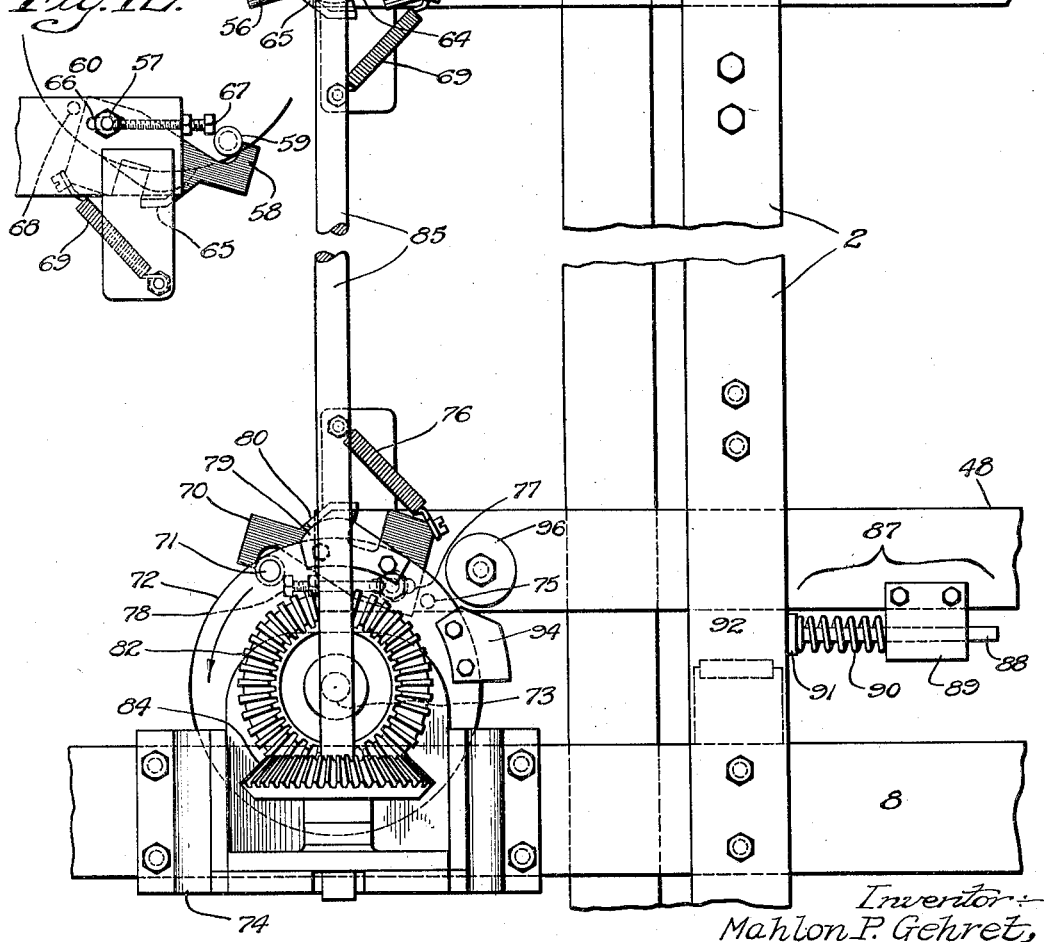

Sept. 16, 1930. M. P. GEHRET 1,776,220
APPARATUS FOR FABRICATING WIRE MESH
Filed Feb. 24, 1930 11 Sheets-Sheet 7
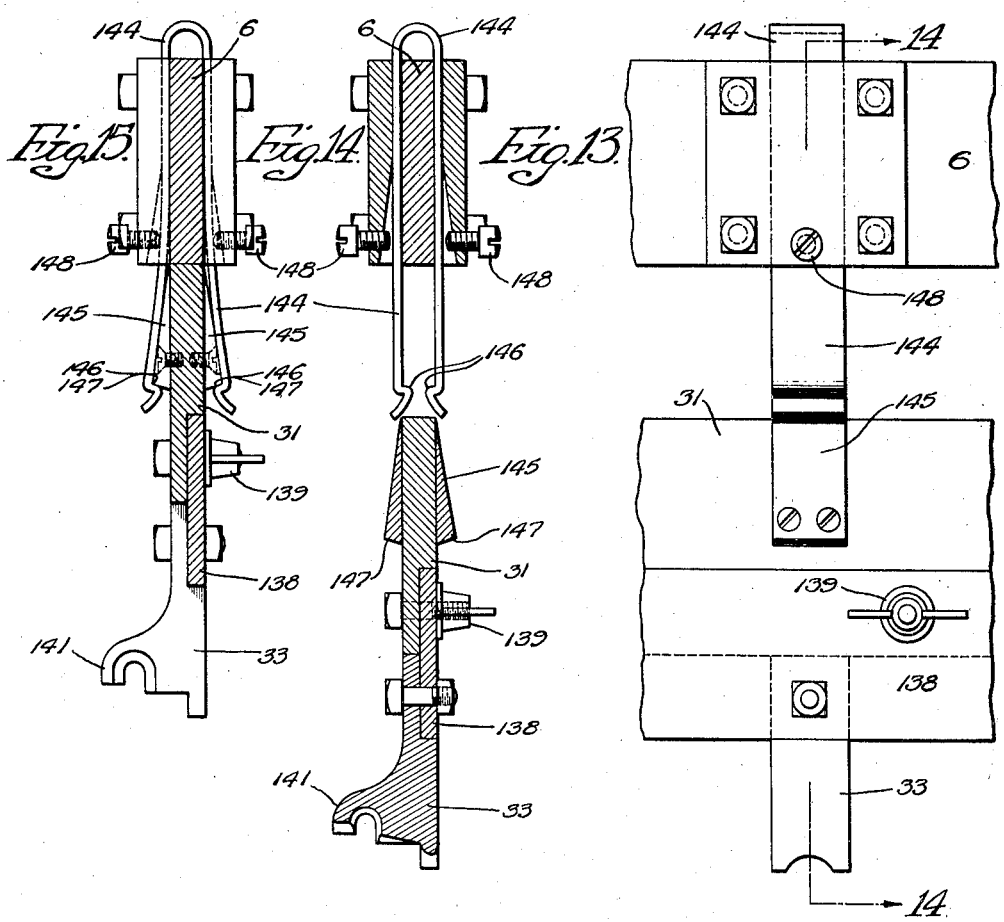
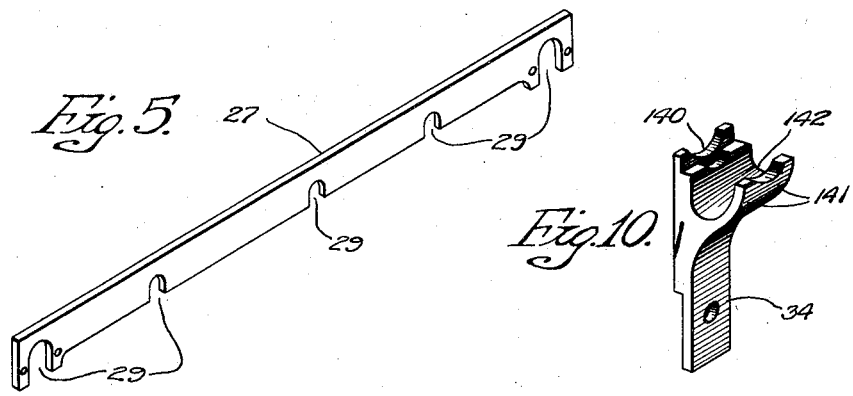
Inventor:
Mahlon P. Gehret,
Deceased.
by Mary A. Gehret,
Executrix.
by her Attorneys
Howson & Howson Sept. 16, 1930.  M. P. GEHRET  1,776,220
APPARATUS FOR FABRICATING WIRE MESH
Filed Feb. 24, 1930  11 Sheets-Sheet 8

Inventor
Mahlon P. Gehret,
Deceased.
by Mary A. Gehret,
Executrix.
by her Attorneys
Howson & Howson

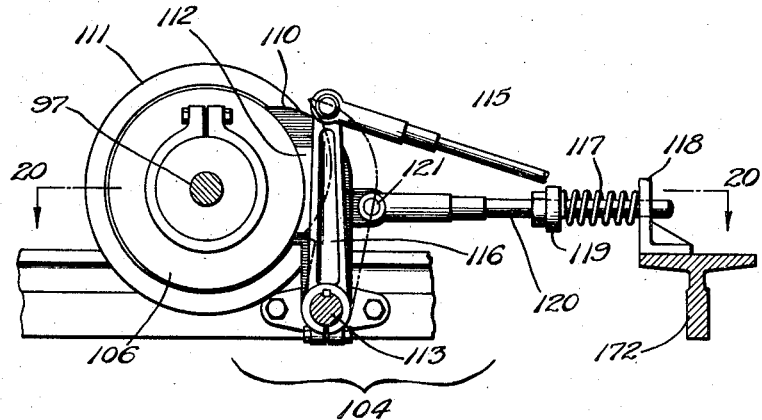
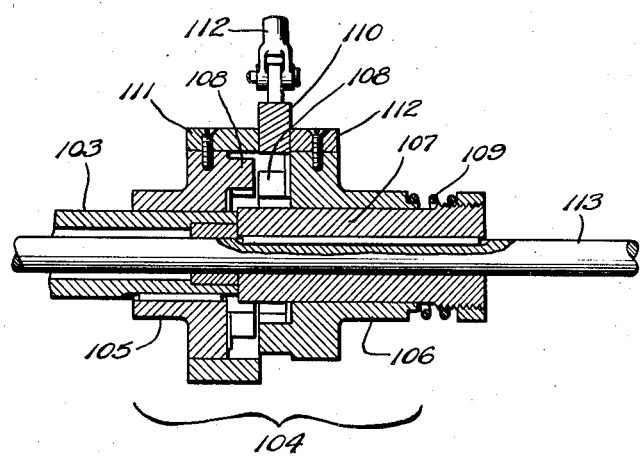

Sept. 16, 1930.        M. P. GEHRET        1,776,220
APPARATUS FOR FABRICATING WIRE MESH
Filed Feb. 24, 1930        11 Sheets-Sheet 10

Inventor:—
Mahlon P. Gehret,
    Deceased.
by Mary A. Gehret,
    Executrix.
by her Attorneys
Howson & Howson

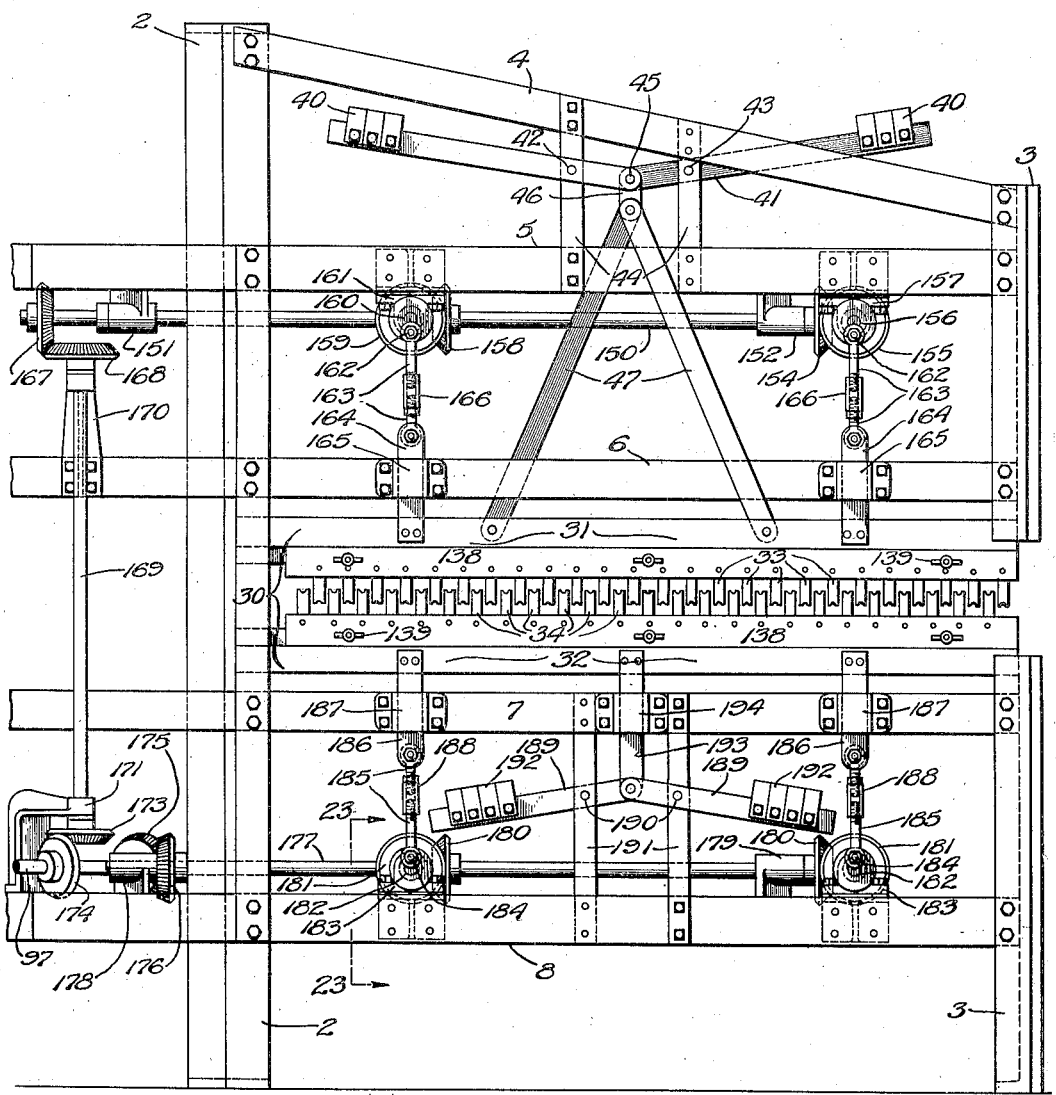

Patented Sept. 16, 1930

1,776,220

UNITED STATES PATENT OFFICE

MAHLON P. GEHRET, DECEASED, LATE OF BRIDGEPORT, PENNSYLVANIA, BY MARY A. GEHRET, EXECUTRIX, OF BRIDGEPORT, PENNSYLVANIA

APPARATUS FOR FABRICATING WIRE MESH

Application filed February 24, 1930, Serial No. 431,026, and in Germany May 7, 1928.

This invention relates to apparatus or machines for fabricating wire mesh and is concerned, more particularly, with a type intended for producing metallic fabric of stout crimped wire useful in the manufacture of protective screens for windows, doors, etc., and characterized by having the mesh openings comparatively large and disposed diagonally relative to the fabric side edges.

Fabrication of wire mesh of the specific variety mentioned, is dependent upon successive formation of angularly-disposed sheds of wire ends trailing from previously-formed fabric with alternate reversals in the relation of such ends for reception of new strands in crossed relation, and successive incorporation of these new strands in the fabric through intermittent progression of the latter during periods between consecutive shed formations. Apparatus heretofore available for weaving diamond wire mesh in accordance with the principle briefly outlined, was usually designed for manual operation, requiring not only special skill on the part of the weaver, but extreme physical effort in manipulation, thereby rendering production very slow and costly, and often with the output faulty or irregular, as well as necessitating trimming with consequent wastage of material.

The main object of the invention is to overcome the various difficulties above pointed out,—that is to say,—to enable fabrication of diamond wire mesh more economically than heretofore and without wastage of material; and to provide an efficient apparatus whereby this may be expeditiously accomplished with minimum labor and expense, as well as without requiring any special skill on the part of the operator.

Another object of the present invention is to secure the foregoing advantages in a weaving apparatus capable of ready and quick adaptation to fabrication of wire mesh differing in the pitch or distance between adjacent wire strands.

A further object of the invention A is the improvement of the prior patent for Apparatus for fabricating wire mesh, granted November 9, 1926, to John K. Gehret and Mahlon P. Gehret, No. 1,605,934. The particular features in which it is sought to improve the structure of the aforesaid patent is in the mounting of the feed rolls whereby advance of the formed mesh is obtained, to provide a more solid support therefor, to improve the operating means for the shed formers by providing means insuring a positive initial return impulse thereof from the operating to the releasing position, to improve the counterbalancing means employed in conjunction with the shed formers to return them to their inoperative position in order that tendency to side strains on the apparatus may be eliminated, and to further generally improve the structure of said machine so that it may be more efficient in operation and durable in service.

The invention further resides in certain novel structural details which make for efficiency in operation and durability of the machine as a whole.

Still other objects and attendant advantages will be manifest from the detailed description, which follows, of the typical embodiment of the invention illustrated by the drawings herewith; and in which Fig. 1 is a plan view;

Fig. 5 is a view in perspective of one of the shaft-supporting elements;

Fig. 6 is a fragmentary section on the line 6—6, Fig. 4;

Fig. 7 is a diagrammatic fragmentary detail plan section showing the manner of formation of the wire mesh, the section being taken as indicated by the arrows 7—7 in Figs. 2 and 4;

Fig. 10 is a perspective view of one of the wire-engaging instrumentalities employed in connection with the shed formers;

Fig. 11 is a fragmentary elevation, on a larger scale than the preceding illustrations, of the mechanism provided for actuating each of the shed formers;

Fig. 12 is a fragmentary elevational view showing a detail of the tooth-bar actuating mechanism;

Fig. 13 is a fragmentary enlargement of a part of the tooth-bar mechanism;

Fig. 14 is a fragmentary sectional view on the line 14—14, Fig. 13;

Fig. 15 is a sectional view similar to that of Fig. 14 but showing the parts in another position;

Fig. 19 is a section, viewed in the direction of the arrows 19—19 in Fig. 21, showing the clutch mechanism for controlling operation of the apparatus;

Fig. 20 is an axial section of the clutch mechanism along the plane indicated by the arrows 20—20 in Fig. 19;

Fig. 22 is a fragmentary side elevation similar to that of Fig. 2 but illustrating the aforesaid modification, and Fig. 23 is a fragmentary section on the line 23—23, Fig. 22.

Figure 1:
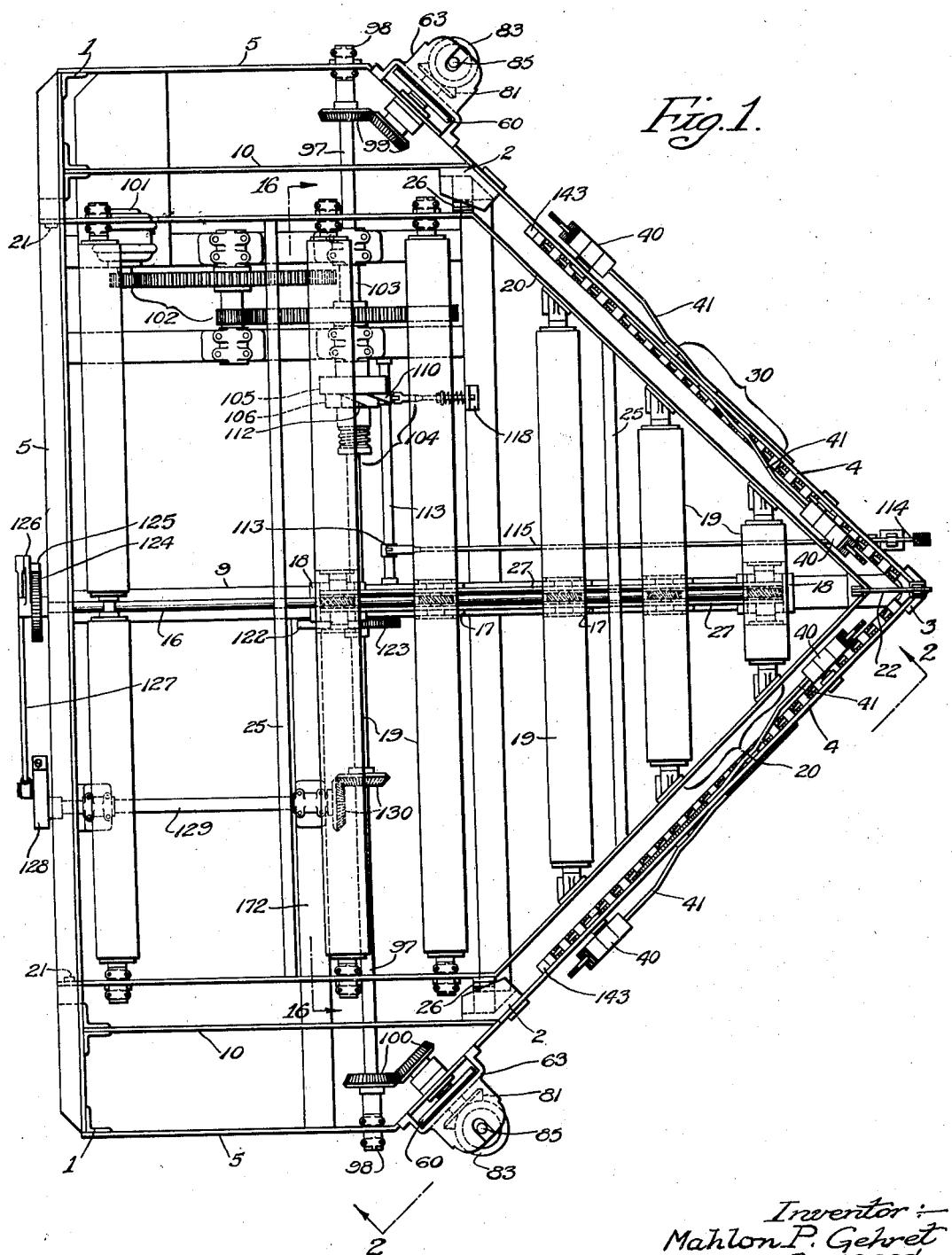
Figure 4:
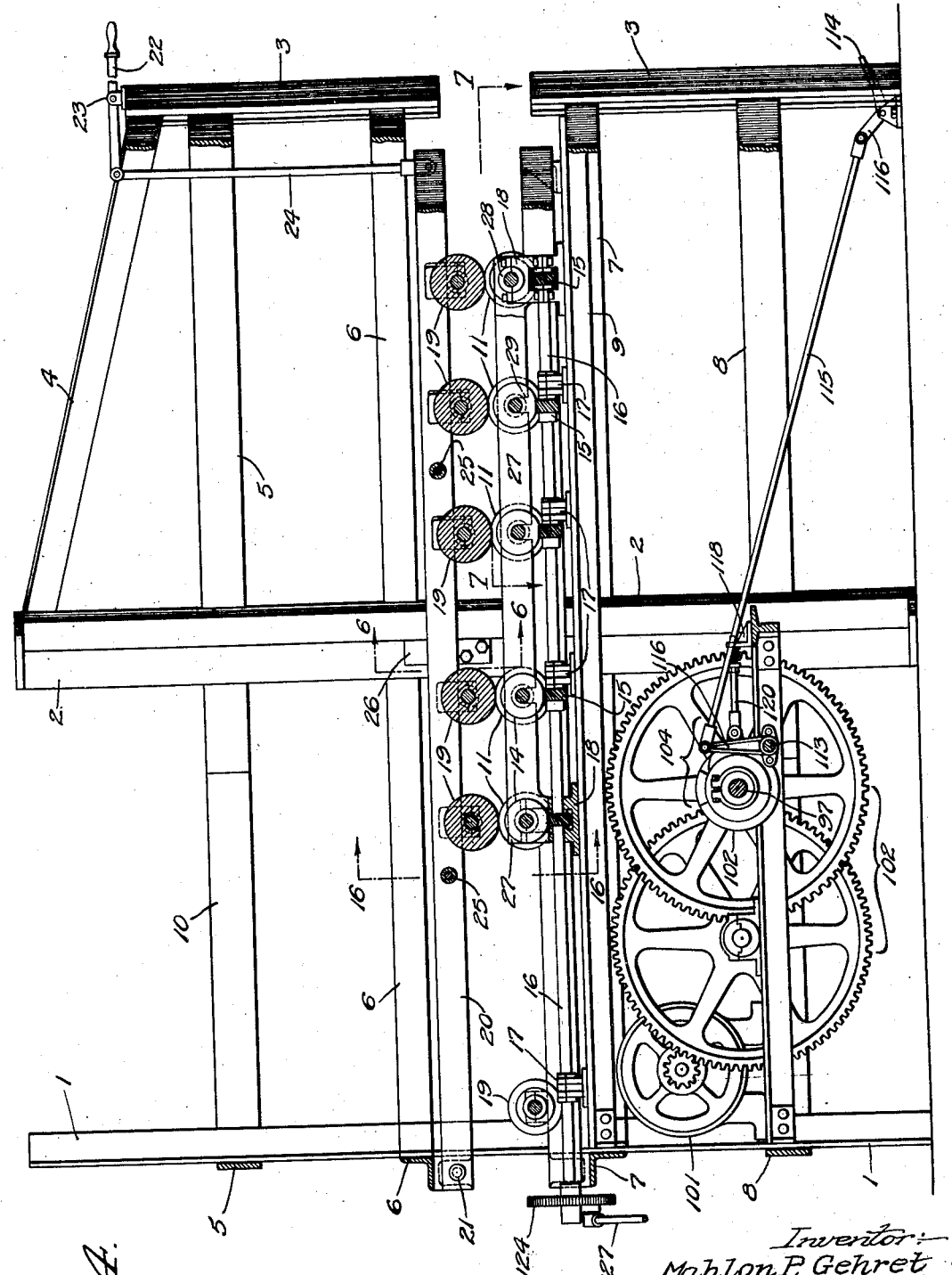
Fig. 4 is a longitudinal sectional view of the organization, with various portions in the background omitted to avoid confusion.
Figure 21:
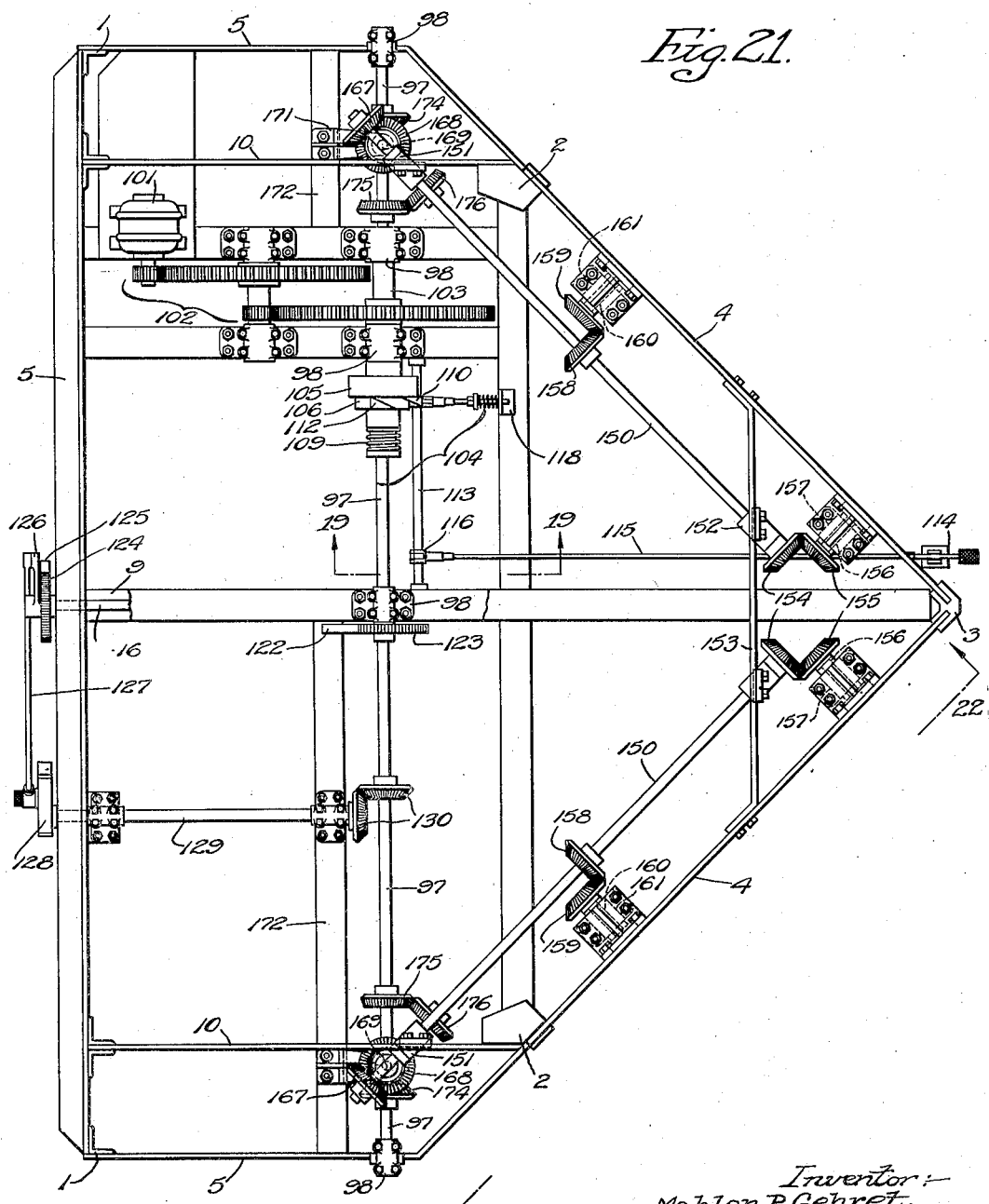
Fig. 21 is a plan view of the apparatus with parts of the upper structure omitted to show the details of the driving mechanism and control elements; and illustrates also a modification of tooth-bar actuating mechanism.

Referring more particularly to Figs. 1 and 21 of the drawings, it will be observed that the main frame of the apparatus is rectangular at the rear end, while its sides approach each other symmetrically at the forward end to meet substantially in a right angle, with the apex thereof in the median line of the structure. In the illustrated apparatus the main frame is built entirely of standard structural iron shapes, comprising rear corner uprights 1, intermediate side columns 2, 2, and a single centrally-located frontal column 3 at the juncture of the angular sides; as well as a series of horizontals which are bolted or otherwise secured to the several uprights and consecutively numbered 4-8 inclusive, reading downwards in Fig. 2. At the level of the horizontal 7, the frame is braced internally (see Figs. 1 and 4), by a longitudinal beam 9, and also by parallel struts 10 that tie the side columns 2 to the rear of the frame structure.

Figure 16:
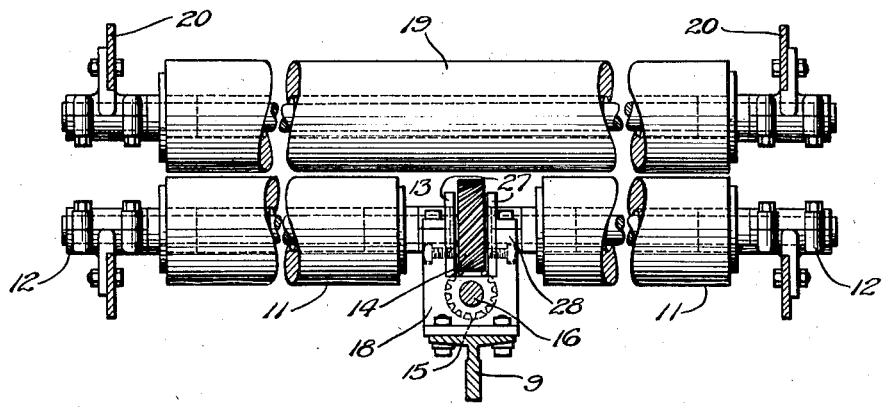
Fig. 16 is a local section taken as indicated by the arrows 16—16 in Figs. 1 and 4, the view being considerably contracted laterally by breaks at convenient intermediate regions.

In the course of manufacture, the metallic fabric (see Fig. 7) is supported upon a horizontal series of rollers 11 whereby it is also progressed through the apparatus. These rollers 11 are located at suitable intervals lengthwise of the structure and are journalled for rotation in appropriate bearings 12 supported by the main frame. As shown in Fig. 16, the rollers 11 are made in two sections with provision, in each instance, of a central space 13 to accommodate a spiral gear 14 which is fixed on the roller shaft and adapted to be driven by an intermeshing spiral pinion 15. The several pinions 15 are fast on a line shaft 16, extending lengthwise of the apparatus— see Figs. 1 and 4, which rotates in journal bearings 17 and 18 mounted upon the longitudinal bracing beam 9. As later explained, the line shaft 16 is intermittently rotated to move the metallic fabric (Fig. 7) as each new pair of strands is incorporated. In order to increase the tractive action of the rollers 11, there is provided a corresponding series of cooperating rollers 19 that are mounted, with capacity for free rotation, in a horizontal overhanging frame 20 which is pivoted at 21 to the rear end of the main frame so that its forward end can be lifted to enable initial threading of a starting piece or length of fabric. The means provided for lifting the frame 20 in the manner just noted, includes a lever handle 22 (see Figs. 1 and 4) fulcrumed at 23 to the top of the frontal column 3 and connected with said frame 20 by a drop link 24. To insure greater rigidity against distortion under the weight of the rollers 19, the frame 20 is braced by tie bars 25, while it is prevented from lateral shifting during movement, by guides 26, one being disposed at each side of the apparatus—see Fig. 1—and bolted to the adjoining intermediate side column 2 of the main frame, as illustrated in Fig. 6. It is essential that the feed rollers 11 run true, and in order to prevent possible distortion thereof under the action of the spiral gears 14 and the pinions 15, there is provided, one at each side of the gears 14 and operatively engaging the respective rollers 11, a bearing bar 27 whose function is to maintain an undistorted axis in the rollers. The ends of these bars 27 are secured by means of screws to the bearings 18 which are extended upwardly to form journals 28 for the overlying rollers 11 and to provide a support for the bars 27. Each of the bars is provided with a series of recesses 29 for reception of the reduced portions of the remaining rollers, (see Fig. 4), which portions neatly fit the recesses and are thereby held in position. Instead of the bars 27, a bearing similar to the bearings 18 may be provided for each of the lower rollers.

Referring more particularly to Fig. 7, it will be apparent that in the weaving of the metallic fabric, it is necessary to form a double shed along the lines A—A and B—B to enable, at each actuation of the apparatus, the incorporation of two new wire strands in crossed relation for each intermittent progression of the fabric whereby the pitch—or the spacing—of the strands is determined. For the purpose mentioned, there is employed what may conveniently be termed "shed formers", comprehensively designated 30 in the several illustrations. These shed formers 30 are identical in construction, and respectively occupy the angular sides of the main frame, one of them being shown complete in side elevation in Fig. 2. Each of the shed formers 30 comprises upper and lower opposing members or jaws 31, 32 respectively provided with projecting teeth 33, 34 that are adapted to intermesh when in the closed or shed-forming position illustrated. The upper member 31 is guided for reciprocative movement through engagement of its opposite ends in suitable slots afforded by the columns 2, 3, and it is equipped with spaced upward projections 35 that extend through guides 36 on the horizontal 6 of the main frame for attachment of circumferentially grooved anti-friction rollers 37. These anti-friction rollers 37 are acted upon by mechanism which includes a longitudinally shiftable bar 38, hung from the upper frame horizontal 5 by a pair of links 39, so as to engage within the circumferential grooves of the rollers 37. Downward movement of the upper shed-forming member 31 is opposed by weights 40 adjustable along oppositely extending levers 41 which are fulcrumed at 42, 43, respectively, to upright frame pieces 44, and which are pivotally connected at 45 to a link 46 which in turn is connected to the upper ends of a pair of straddling links 47, the lower ends of which are attached to the upper jaw 31. Counterweights 40 serve to return the upper jaw 31 to its elevated position when the actuating bar 38 is moved to its dotted line position in Fig. 2. The lower shed-forming member 32 is likewise guided for vertical reciprocation with its ends engaging appropriate slots afforded by the columns 2, 3, and it is actuated in a similar manner, but in opposition to its own weight, by a longitudinally shiftable bar 48 pivotally connected to the lower frame horizontal 8 by links 49 which engage grooved anti-friction rollers 50 mounted on depending projections 51 of said lower member 32. The upward movement of the lower jaw 32 is aided, and the downward movement of the jaw controlled, by a counterweight 52 carried at one end of a lever 53 pivotally secured at 54 to the lower frame horizontal 8 and having at its other end a roller 55 adapted to engage the under side of the bar 48, as shown in Fig. 2.

Figure 2:
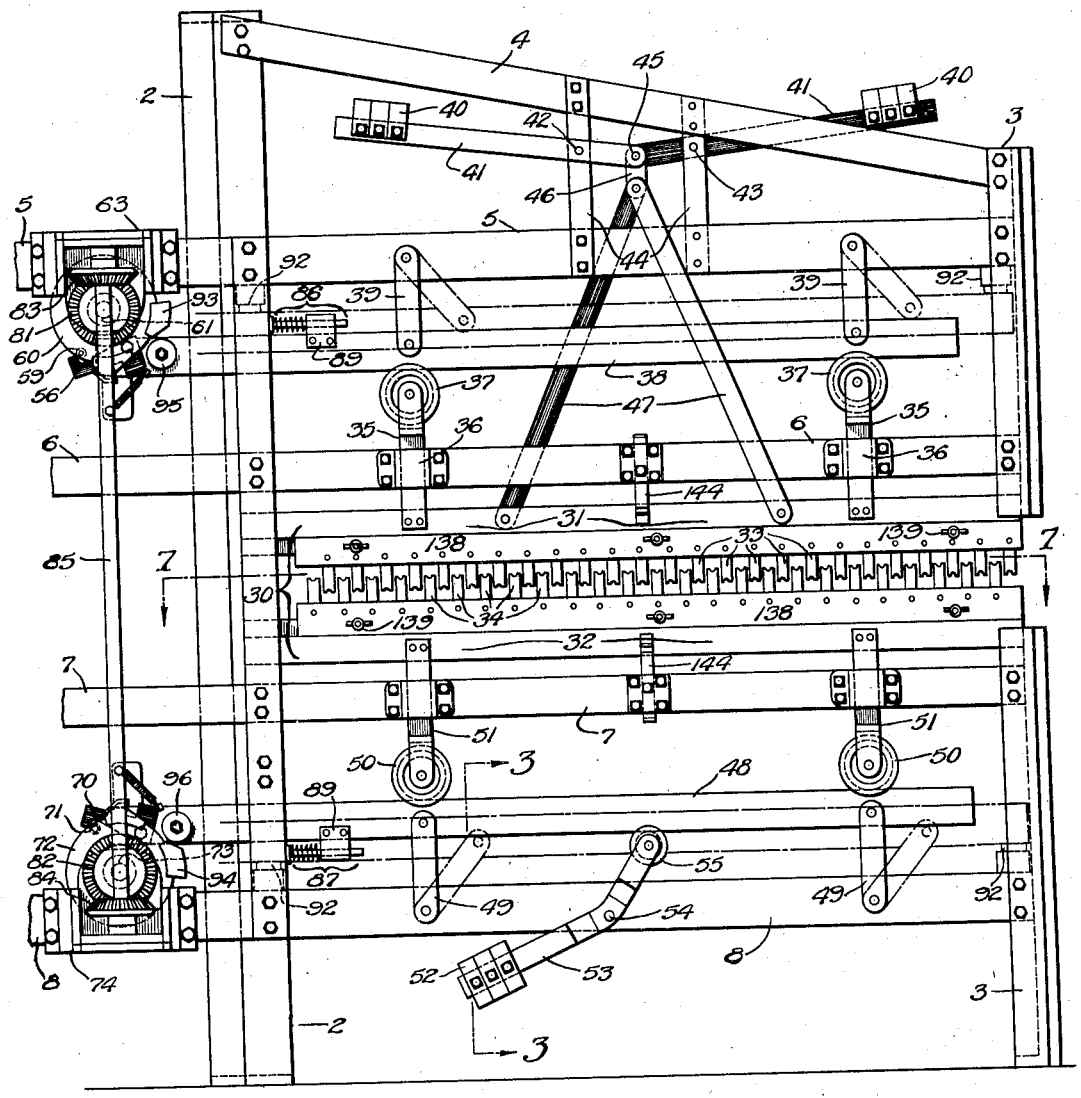
Fig. 2 is a fragmentary side elevation of the apparatus viewed in the direction of the arrows 2—2, in Fig. 1.
Figure 3:
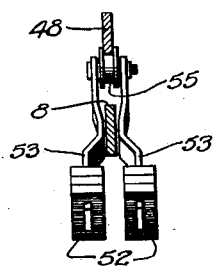
Fig. 3 is a fragmentary sectional view taken on the line 3—3, Fig. 2.

The shiftable bars 38 and 48 are simultaneously actuated by mechanism shown at the left hand end of Fig. 2, and in greater detail to a larger scale in Fig. 11. In the case of the upper bar 38, there is employed at the left hand end thereof a spring controlled latch 56 which is pivoted on a stud 57 for engagement of its hooked end 58 with a pin 59 on a rotatable disk 60. This disk 60 is fixed upon a stub shaft 61 journaled in a depending bearing 62 of a bracket 63 bolted to the frame horizontal 5. Incidental to rotation of the disk 60 in the direction indicated by the arrow thereon, the bar 38 will be moved to the left as viewed in Fig. 11 and the toothed member 31 thereby depressed.

Disengagement between the hooked end 58 of the latch 56 and the pin 59 is automatically brought about, subsequently, by a cam 64 on the disk 60 which is adapted to engage a transversely projecting flange 65 on the latch and thereby to force the latch downwardly around its pivot. To afford an adjustment of the point of kick-off or detachment of the hook 58 from the pin 59, the latch pivot stud 57 is made adjustable in a longitudinal slot 66 in the bar 38 through the medium of a bolt 67, see Fig. 12. A stop pin 68 on the shiftable bar 38 normally holds the latch 56 substantially in a horizontal position against the influence of the spring 69, so that its hooked end is always in readiness for coaction with the pin 59 on the rotating disk 60.

A similar group of cooperative parts is relied upon to actuate the lower shiftable bar 48,—that is to say,—a latch hook 70 pivoted to the left hand end of said bar is adapted for engagement by the pin 71 on a rotatable disk 72 mounted on a stub shaft 73 rotatable in a bearing bracket 74, an exact counterpart of the bearing bracket 63.

The latch 70, inverted in this instance, is held in a normal position against a stop pin 75 by means of a spring 76. The latch is adjustable longitudinally of the bar 48 through the medium of a slot 77 and bolt 78, and the kick-off or disengagement of the hook and pin is effected through a cam 79 on the disk 72 which engages a flange 80 on the latch and thereby rocks the latter away from the pin. Simultaneous driving of the rotatable disks 60 and 72 is effected through the medium of miter gears 81, 82, respectively, on the stub shafts 61, 73, which mesh with companion miter bevels 83, 84 fixed on a vertical coordinating shaft 85. Thus, concurrent with each rotation of the coordinating shaft 85, the shiftable bars 38, 48 are moved from the dot-and-dash line positions to the full line positions shown in Fig. 2.

For the purpose of assisting return movement of the shiftable bars 38, 48 to the dot-and-dash line positions upon disengagement of the latches 56, 70, there is provided "kick-off" devices indicated respectively at 86, 87 in Figs. 2 and 11. Each of these "kick-off" devices embodies a bolt 88 slidable in a fitting 89 secured to the corresponding shiftable bar, and subject to a spring 90 tending to urge a terminal head 91 against the contiguous side column 2. Thus, as the shiftable bars 38, 48 are moved to the left, (Fig. 2) energy is stored in the springs 90, said energy being subsequently spent in initiating movement of the bars 38, 48 in the opposite direction; or, in other words, to move them sufficiently for advancement of the links 39, 49 beyond the vertical dead center, thereby enabling gravity to complete movement of the bars 38, 48 to the dot-and-dash line positions. This "kick-off" and return movement will naturally be rapid, and in order to avoid incidental noise, as well as shock to the apparatus frame, there is provided suitable buffers 92—of rubber or the like—against which the bars 38, 48 come to rest.

In addition to or in place of the "kick-off" devices 86, 87, there may be provided a positive kick-off in the form of cams 93, 94 on the disks 60, 72 respectively adapted to contact with rollers 95, 96 on the respective bars 38, 48, thereby, as the disks revolve, positively forcing the bars to the right, Fig. 11, beyond the vertical dead center positions of the links 39, 49.

The shed formers 30 at respectively opposite angular sides of the main frame must of course be simultaneously operated. To this end, the main shaft 97, see Figs. 1 and 21, extends the full width of the apparatus and is journaled in bearings 98, said shaft imparting power by means of miter gear couples 99, 100 to the stub shafts 73 of the actuating means associated with the two lower shiftable bars 48 for transmission, in turn, to the upper shiftable bar actuating means through the vertical coordinating shafts 85.

In the embodiment of this invention illustrated, the machine derives power from an electric motor conventionally indicated at 101 in Figs. 1 and 21. Affixed to the shaft of this motor is a spur pinion which transmits motion, through an interposed train of speed reduction gears 102 to a sleeve 103 normally rotatable freely upon the main shaft 97. The power from the motor 101 is transmittible from the sleeve 103 to the shaft 97 under control of a clutch generally indicated in the drawings by the numeral 104 and shown on a larger scale in Figs. 19 and 20. This clutch 104 comprises opposed coupling members in the form of disks 105, 106 whereof the former is keyed to the sleeve 103, while the latter 106 has capacity for movement toward and away from the former 105 by virtue of being axially slidable on a square bushing 107 keyed to the shaft 97, see Fig. 20. The clutch members or disks 105, 106 are provided with teeth 108 capable of interlocking but normally held separated in opposition to a compression spring 109 by a wedge shoe 110 which engages between a circumferential facing flange 111 on the disk 105 and a cam block 112 on the periphery of the opposing clutch disk 106. The wedge shoe 110 is fixed to a rock shaft 113 (see Fig. 19) so as to be swingable to the dot-and-dash line position indicated in said illustration. As more clearly shown in Fig. 1, the shoe 110 has a tapered nose, one side of which flatly opposes the inner edge of the flange 111 and the other side of which is adapted for co-action with the cam block 112 which has an angularly-disposed face for co-action therewith. When the angularly-disposed face of the wedge block comes into engagement with the co-acting face of the wedge shoe, the camming action causes an axial shifting of the member 106 of the clutch, disengaging this member from the member 105. Immediately upon withdrawal of the wedge shoe 110, the clutch member or disk 106 is urged forwardly by the compression spring 109 for meshing engagement of the teeth thereon with those of the member or disk 105. As a convenient means for retracting the wedge shoe 110, there is provided a treadle 114 adjacent the foot of the frontial column 3, Figs. 4 and 21, said treadle being connected by a link 115 with a lever arm 116 keyed on the rock shaft 113. Depression of the treadle 114 is opposer by a helical spring 117 abutting at one end against a fixture 118 rigidly mounted in the apparatus sub-framework, and at the opposite end against an adjustable collar 119 on a slide rod 120 having one extremity guided in said fixture 118, and the other pivotally connected at 121 to the wedge shoe 110. To set the apparatus in motion, it is necessary to depress the treadle 114 for but an instant to permit interengagement between the clutch members or disks 105, 106 and thereby effecting coupling of the sleeve 103 with the shaft 97. The just explained motion continues, however, only for one complete revolution of the shaft 97, as determined by subsequent automatic action of the wedge shoe 110 in spreading the clutch members or disks 105, 106 to their normal separated positions, as illustrated in Fig. 20. Retrogressive movement, incidental to the operation of the main shaft 97 is prevented by engagement of a detent 122 with a ratchet wheel 123 secured to said shaft, see Figs. 1 and 21.

Figure 17:
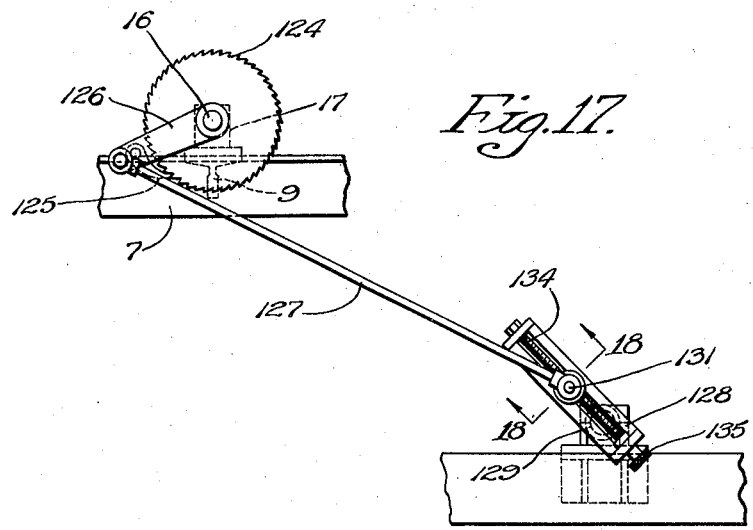
Fig. 17 is a fragmentary elevation of the mechanism for progressing the metallic fabric through the apparatus.

The rollers 11, by which the fabric is progressed through the apparatus, receive motion from the same source of power that serves the shed formers 30, the interposed mechanism being as follows:

To the rear end of the line shaft 16 which carries the several spiral pinions 15 is affixed a ratchet wheel 124 picked by a pawl 125 carried by an arm 126 mounted for oscillation on the rear end of said shaft. The outer end of the arm 126 is coordinated by a link 127 (see Fig. 17) with a crank 128 secured to the rear end of a countershaft 129 adapted to be driven from the main shaft 97 through the medium of a miter gear couple comprehensively indicated 130 in Figs.

Figure 18:
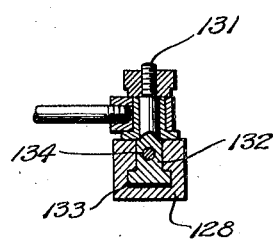
Fig. 18 is a detail section taken as indicated by the arrows 18—18 in Fig. 17.

1 and 21, and thereby given a single rotation with each actuation of the apparatus. In order that the extent of motion imparted to the progressing rolls 11 may be accurately regulated, the eccentric pin 131 is made adjustable along the crank 128 by the means illustrated in Fig. 18. As shown, the eccentric pin 131 projects laterally from a block 132 located within a longitudinal groove 133 of the crank 128 which is engaged by an adjusting screw 134 rotatable in bearings at opposite ends of said crank 128. At one end, the screw 134 is provided with a manipulating head 135 for convenience in effecting adjustment. With the means just described, it is possible to adjust the throw of the pawl 125 and vary the influence of the latter upon the ratchet wheel 124 which is instrumental in causing intermittent rotation of the traction rollers 11 and progressive movement of the fabric.

Referring again to Fig. 2, it will be noted that the wire-engaging teeth 33, 34 are not directly attached to the opposing jaws 31, 32 of the shed formers 30, but to plate elements 138 that are removably secured to said members by wing nuts 139 engaging projecting screw studs. This arrangement permits ready and quick interchange of elements having teeth differently spaced so that the apparatus may be adapted for weaving wire fabrics with correspondingly different pitch of the diamond meshes. The teeth 33, 34 are furthermore separately attached, by screws or other suitable fastening devices, to the elements 138, to enable easy replacement in the event of breakage of one or more of them. As shown in Fig. 10, the ends of the teeth 33, 34 are notched laterally as at 140 to receive and centralize the wire strands, and at the rear have lateral offsets 141 with longitudinal recesses 142 to form, collectively considered, continuous guides for receiving the new wire strands S, S' which are to be incorporated in the fabric, the depressions being preferably tapered as illustrated, to afford easy approaches and thereby facilitate introduction of said wires. The positions of the crossed strands in the fabric are determined by stops 143 which limit the extent to which they may be initially inserted in the sheds established by the respective teeth 33, 34, said stops being located adjacent the last teeth at the inward ends of the lower members 32 of the shed formers 30, as shown in Fig. 7.

Figure 8:
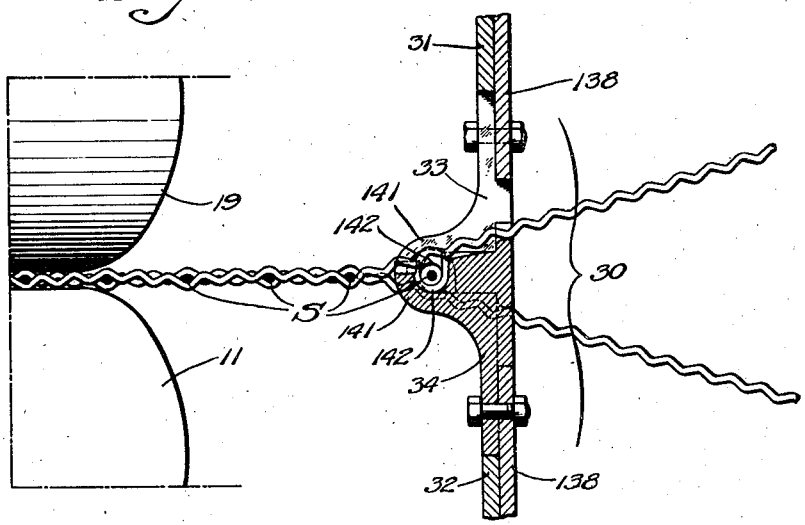
Figs. 8 and 9 are detail sectional views showing the operation of the shed-forming means.
Figure 9:
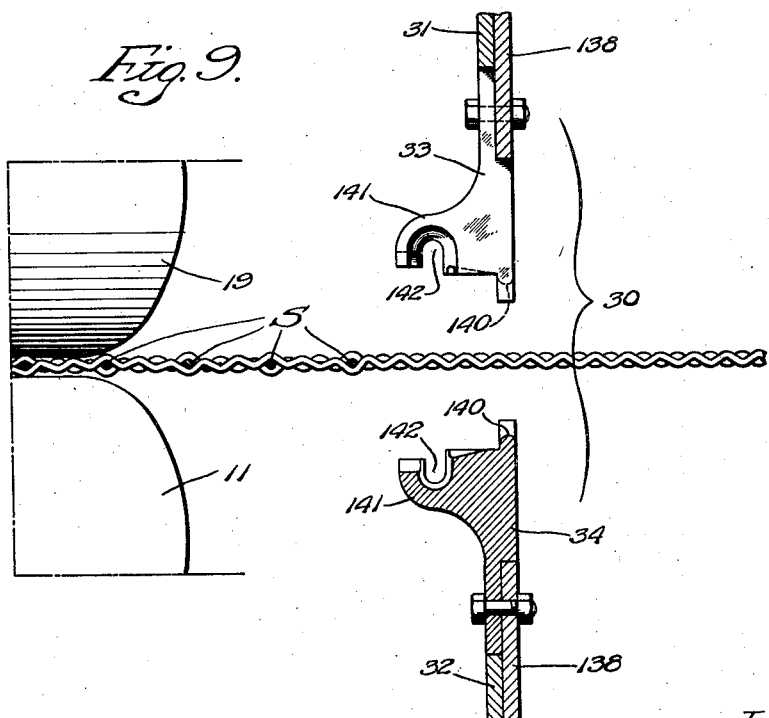

Briefly described, the operation of the apparatus is as follows:

To begin with, it is to be assumed that the apparatus comes to rest after each actuation with the opposing jaws 31, 32 of the two shed formers 30 in closed position, and with the teeth 33, 34, flexing the trailing ends of alternate strands of the fabric in opposite directions—as shown in Fig. 8—to provide the sheds. New strands S, S' are thereupon placed in the sheds in cross relation, see Fig. 7, such placement being facilitated by the guides jointly afforded by the lateral offsets 141 of the teeth 33, 34 of the shed formers 30. With the new strands S, S' properly positioned, the operator depresses the treadle 114 to retract the wedge shoe 110 from between the opposing disk members 105, 106 of the clutch 104, thereby effecting automatic coupling of the sleeve 103 with the main shaft 97 to set the apparatus in motion. Incidental to turning of the main shaft 97 one complete revolution for each actuation of the apparatus, motion is transmitted (through the various interposed instrumentalities previously described, including the vertical coordinating shafts 85) simultaneously to the rotatable disks 60, 72 of the shed former actuating means at opposite angular sides of the main frame. As a result, the shiftable bars 38, 48, respectively associated with the shed formers 30, are first moved forward by cooperation of the latches 56, 70 with the respective pins 59, 71 on the disks 60, 72 to effect approach of the teeth 33, 34, and secondly upon subsequent release to the action of the "kick-off" devices, they temporarily assume under the assistance of gravity, the dot-and-dash line positions indicated in Fig. 2; or, with the teeth 33, 34 relatively separated.

In the separating movement of the teeth, rebound of the delicately counterbalanced jaws 31 and 32 from the frame horizontals 6 and 7, with which they respectively contact, is prevented by means of spring clips 144 (see Figs. 2, 13–15) which are secured to the said horizontals 6 and 7 respectively and which are adapted to engage and grip arms 145 projecting from the jaws 31, 32. The said clips 144 comprise spaced flexible arms formed with inturned opposed shoulders 146, and the arms 145 are generally tapered at the extremities and are provided with shoulders 147 which when the arms enter between the flexible arms of the clips, as shown in Fig. 15, are interlocked with the shoulder 146. The jaws 31, 32, are thus prevented from rebounding from the horizontals 6 and 7. The clips 144 have not sufficient strength to retain the arms 145 against the impulse resulting from the engagement of the latches 56 and 70 with pins 59 and 71 as previously described, and when this engagement occurs, the retentive hold of the clips on the jaws is broken. Adjustment of the arms of the clip to regulate the tension thereof against the sides of the arms 145 is afforded by the provision of set screws 148, as shown in Figs. 13, 14 and 15. During the period of separation of the shed formers 30, the fabric is progressed, by motion imparted to the tractile rolls 11 under the action of the pawling mechanism shown in Fig. 17, in the manner previously explained, with resultant transposal of the trailing wire ends of said fabric relative to the teeth 33, 34 of the opposing members 31, 32 respectively, so that the sheds are reversed upon subsequent approach of the teeth (which immediately follows), the apparatus thereafter coming to rest with the shed formers 30 closed after a complete cycle of the operations just recited. By employing crimped wire with the crests of the crimps spaced say a quarter of an inch apart, and with proper interchange of the shed-forming elements, it is possible to produce with the apparatus described, wire mesh ranging from one-half inch pitch to an inch and a half pitch, or even more, as may be desired or required.

In Figs. 21, 22 and 23, there is illustrated a modification of the mechanism for actuating the shed-forming jaws 31 and 32. In this instance, there is provided at each side of the machine a shaft 150, said shafts being journaled in bearings 151 and 152 carried respectively by the frame pieces 10 and a frame piece 153 extending at the front of the machine between the horizontal frame bars 5. Each of these shafts 150 carries at one end a bevel pinion 154, each of which mesh with a pinion 155 carried by a stub shaft 156 journaled in bearings 157 secured to the inner sides of the frame horizontals 5. Each of the shafts 150 also carries a second bevel pinion 158, each of which meshes with a pinion 159 on a stub shaft 160 journaled in a bearing 161 also secured to the inner sides of the frame horizontals 5. Each of the two stub shafts 156 and 160 at each side of the frame has at its inner end a crank 162 which through a connecting rod 163 is connected with the upper movable member or jaw 31, the lower end of the connecting rod 163 being directly connected to an upwardly extending guide bar 164 attached at its lower end to the jaw 31 and operating through a guide bracket 165 on the frame horizontal 6. The connecting rods 163 are adjustable as to length through turnbuckles 166.

Each of the shafts 150 carries at its rear end a bevel pinion 167 which meshes with a bevel pinion 168 at the top of a vertical shaft 169, which latter shafts are journaled in brackets 170 and 171 respectively attached to the frame horizontals 6 and to a frame tie bar 172. Each of the shafts 169 has at its lower end a bevel pinion 173 which meshes with a bevel pinion 174 on the main shaft 97, and in the present instance the main shaft also carries towards each end a bevel pinion 175 which meshes with a bevel pinion 176 secured to a shaft 177, these latter shafts extending parallel to and directly below the shafts 150 at each side of the machine and being supported in journals 178 and 179 carried respectively on the frame struts 10 and the lower frame struts 153. The shaft 177 carries also two bevel pinions 180, each of which meshes with a pinion 181 on a stub shaft 182 journaled in a bearing 183 attached to the inner side of the frame bars 8, and each of the stub shafts 182 has at its inner end a crank 184 which is connected through a connecting rod 185 with the lower movable member or jaw 32. The connection between each of the connecting rods 185 and the jaw 32 is established through a depending guide bar 186, these bars sliding through guide brackets 187 on the frame horizontal 7. The connecting rods 185 are adjustable as to length through the medium of a turnbuckle 188.

From the foregoing description, it will be apparent that power applied through the main shaft 97 vertically reciprocates, through the trains of mechanism described above, the jaws 31 and 32 to form the shed in the manner previously set forth.

In order to counterbalance the weight of the lower jaw 32, there is provided a pair of arms 189 which are pivotally secured intermediate their ends at points indicated by 190, see Fig. 22, to a pair of frame uprights 191. These arms at their outer ends carry weights 192, and at their inner ends are pivotally connected with the lower end of a bar 193 depending from the jaw 32 and extending through a guide bracket 194 on the frame horizontal 7. The weights 192 are adjustable and function to relieve the cranks 184 of the greater portion of the weight of the lower movable member 32 and the associated parts. By providing the double arm construction of the counterweight mechanism, it will be apparent that a substantial balance is obtained in the apparatus which has no tendency to transversely displace the guide bar 193 or the jaw 32, the latter having a free vertical movement in the frame free from transverse thrusts. The same balanced effect is obtained in the upper jaw 31 by the counterbalance device associated therewith including the two pivoted arms 41 and the connecting rods 47.

It will be apparent that the machine may be modified in other details without departure from the invention.

Claims:

1. In apparatus for fabricating diamond wire mesh, the combination with mechanism for intermittently advancing a previously formed fabric, of vertically reciprocable shed-forming elements adapted to engage wire ends trailing from said fabric, mechanism coordinated with said fabric-advancing mechanism and giving a positive movement of the shed-forming elements in one direction to form the said wire ends into angularly-disposed sheds with alternate reversals in the relation of said ends, and counterbalancing means for said shed-forming elements including in each instance a pair of pivotally mounted arms extending in opposite directions and weighted at their outer ends, and means operatively connecting the inner ends of said arms with the shed-forming elements.

2. In apparatus for fabricating diamond wire mesh, the combination with mechanism for intermittently advancing a previously formed fabric, of oppositely moving shed-forming elements adapted to engage wire ends trailing from said fabric, mechanism for bringing said elements together in a shed-forming operation, said elements being thereafter separable by gravity to release the wire ends during the advance movement of the fabric, abutments for said shed-forming elements limiting their movement under the force of gravity, and resilient means for preventing rebound of said elements from the said limiting abutments.

3. In apparatus for fabricating diamond wire mesh, the combination with mechanism for intermittently advancing a previously formed fabric, of oppositely moving shed-forming elements adapted to engage wire ends trailing from said fabric, mechanism for bringing said elements together in a shed-forming operation, said elements being thereafter separable by gravity to release the wire ends during the advance movement of the fabric, abutments for said shed-forming elements limiting their movement under the force of gravity, and resilient means for preventing rebound of said elements from the said limiting abutments, said resilient means comprising spring clips operative when the elements approach the abutments to retain the said elements in a predetermined position, and automatically releasable when the means are moved towards each other by the said actuating mechanism.

4. In apparatus for fabricating diamond wire mesh, the combination with automatically operative means adapted to successively form angularly-disposed sheds of wire ends trailing from previously formed fabric with alternate reversals in the relation of said wire ends, of coordinated means operative to advance the fabric between successive shed-forming operations including opposed sets of traction rollers arranged in cooperative pairs, the rollers of one set having reduced mid sections, mechanism operatively engaging the rollers in said reduced portions for actuating the rollers, and relatively fixed means also engaging the rollers in said reduced portions to reinforce and to prevent distortion of the rollers.

5. In apparatus for fabricating diamond wire mesh, the combination with automatically operative means adapted to successively form angularly-disposed sheds of wire ends trailing from previously formed fabric with alternate reversals in the relation of said wire ends, of coordinated means operative to advance the fabric between successive shed-forming operations including opposed sets of traction rollers arranged in cooperative pairs, the rollers of one set having reduced mid sections, mechanism operatively engaging the rollers in said reduced portions for actuating the rollers, bearings adapted to support at least two of said rollers in the reduced portions, and bearing bars attached to said bearings and operatively engaging the others of said rollers in their reduced sections to prevent distortion of the rollers in operation.

6. In apparatus for fabricating diamond wire mesh, the combination with automatically operative means adapted to successively form angularly-disposed sheds of wire ends trailing from previously formed fabric with alternate reversals in the relation of said wire ends, of coordinated means operative to advance the fabric between successive shed-forming operations including opposed sets of traction rollers arranged in cooperative pairs, the rollers of one set having reduced mid sections, mechanism operatively engaging the rollers in said reduced portions for actuating the rollers, and journal members also operatively associated with said reduced portions and supporting the rollers in the mid sections.

7. In apparatus for fabricating diamond wire mesh, the combination with automatically operative means adapted to successively form angularly disposed sheds of wire ends trailing from previously formed fabric with alternate reversals in the relation of said wire ends, of coordinated means operative to advance the fabric between successive shed-forming operations including opposed sets of traction rollers arranged in cooperative pairs, the rollers of one set having reduced mid sections, spiral gears secured to the rollers in said mid sections, a shaft extending transversely of said rollers, a plurality of spiral gears on said shaft engaging the spiral gears of said rollers respectively, and bearing elements for said shaft including journals for the reduced portions of said rollers.

8. In apparatus for fabricating diamond wire mesh, the combination with mechanism for advancing a previously formed fabric intermittently, of reciprocable shed-forming elements arranged in opposition adapted to engage wire ends trailing from said fabric, a pivotally suspended bar operatively associated with each of said elements, and means for longitudinally shifting said bars simultaneously to effect approach of the opposing elements to form the shed, said shifting means comprising a rotary member having a projecting pin, a hook movably mounted on said bar, means normally retaining the hook in the path of the pin whereby when the disk revolves the pin engages the hook to longitudinally shift the bar, and positive knock-off means for disengaging the hook from the pin at a predetermined point to permit the retractive movement of the bar.

9. In apparatus for fabricating diamond wire mesh, the combination with mechanism for advancing a previously formed fabric intermittently, of reciprocable shed-forming elements arranged in opposition adapted to engage wire ends trailing from said fabric, a pivotally suspended bar operatively associated with each of said elements, and means for longitudinally shifting said bars simultaneously to effect approach of the opposing elements to form the shed, said shifting means comprising a rotary member having a projecting pin, a hook pivotally mounted on the bar, a spring normally retaining the hook resiliently in the path of said pin whereby as the said member revolves the pin engages the hook to thereby shift the bar, and a cam carried by said rotary member and adapted to shift the hook out of engagement with the pin at a predetermined point to permit the retractive movement of the bar.

10. In apparatus for fabricating diamond wire mesh, the combination with mechanism for advancing a previously formed fabric intermittently, of reciprocable shed-forming elements arranged in opposition adapted to engage wire ends trailing from said fabric, a pivotally suspended bar operatively associated with each of said elements, and means for longitudinally shifting said bars simultaneously to effect approach of the opposing elements to form the shed, said shifting means comprising a rotary member, cooperative means on said member and on the bar intermittently operative as the member rotates to shift the bar, and means carried by said rotary member and adapted to give the bar an initial impulse in the opposite direction for the retractive movement of the bar.

11. In apparatus for fabricating diamond wire mesh, the combination with mechanism for advancing a previously formed fabric intermittently, of reciprocable shed-forming elements arranged in opposition adapted to engage wire ends trailing from said fabric, a pivotally suspended bar operatively associated with each of said elements, and means for longitudinally shifting said bars simultaneously to effect approach of the opposing elements to form the shed, said shifting means comprising a rotary member, cooperative means on said member and on the bar and intermittently operative in the rotation of said member to shift the bar in one direction, and means carried by the rotary member and operative following disengagement of said cooperative members for positively moving the bar in the opposite direction.

12. In apparatus for fabricating diamond wire mesh, the combination with mechanism for advancing a previously formed fabric intermittently, of reciprocable shed-forming elements arranged in opposition adapted to engage wire ends trailing from said fabric, a pivotally suspended bar operatively associated with each of said elements, and means for longitudinally shifting said bars simultaneously to effect approach of the opposing elements to form the shed, said shifting means comprising a rotary member, cooperative means on the member and on the bar for shifting the bar periodically in one direction, and a cam on said rotary member and operative following disengagement of said cooperative shifting means to force the bar in the opposite direction.

MARY A. GEHRET,
*Executrix of the Last Will and Testament of Mahlon P. Gehret, Deceased.*